Feb. 17, 1970 C. L. HOPKINS 3,496,385

HIGH VOLTAGE COMPENSATED TRANSISTORIZED SWITCHING APPARATUS

Filed Feb. 28, 1966 3 Sheets-Sheet 1

INVENTOR.
CHARLES L. HOPKINS

BY Anthony D. Cennamo
Paul W. Fish

ATTORNEYS

HIGH VOLTAGE COMPENSATED TRANSISTORIZED SWITCHING APPARATUS

Filed Feb. 28, 1966 3 Sheets-Sheet 2

INVENTOR.
CHARLES L. HOPKINS
BY Anthony J. Casimano
Paul W. Fish
ATTORNEYS

INVENTOR.
CHARLES L. HOPKINS
BY Anthony D. Cennamo
Paul W. Fish
ATTORNEYS

United States Patent Office 3,496,385
Patented Feb. 17, 1970

3,496,385

HIGH VOLTAGE COMPENSATED TRANSISTORIZED SWITCHING APPARATUS

Charles L. Hopkins, Webster, N.Y., assignor to Xerox Corporation, Rochester, N.Y., a corporation of New York Filed Feb. 28, 1966, Ser. No. 530,479
Int. Cl. H03k *17/00*
U.S. Cl. 307—254 5 Claims

ABSTRACT OF THE DISCLOSURE

Transistors are connected in series in a voltage protected circuit to provide a high voltage switching device. Timing circuits are employed to insure that safe voltage levels are maintained within the voltage rating of the transistor devices, during the turn-on and turn-off times. The ratio of the protective time circuits and the load time circuit is maintained at a predetermined value.

This invention relates to transistorized switching apparatus and, more particularly, to improved, voltage compensated transistorized high voltage switching apparatus.

Transistors and diodes have rapidly become widely used devices in switching applications. Among the many devices that are capable of accomplishing switching functions, only semiconductors have so broad a combination of desirable features, including low power consumption, high speed, small size, no filament power consumption, low cost and remarkably long life. In order to efficiently utilize transistors in electronic circuits, particularly where reliability is an important factor, the design engineer must adhere to the manufacturer's specification data for the particular element to insure that the use is within the element's rated limitations.

Transistors and other electrical components may be purchased either in batch lots wherein the parameters are likely to vary widely or in accordance with predetermined purchase order specifications wherein the specified parameters will vary only within prescribed limits. In the latter case, the manufacturer tests and sorts the various elements to insure that the parameters are held within the purchase order specificaions. However, the purchase of matched or closely controlled elements greatly increases the cost per item.

The circuit designer's problems due to maximum limitations on power dissipation and voltage rating of commercially available transistors becomes acute where transistors are utilized in a high voltage switching apparatus. For while it is known in the art to employ transistors having high voltage or power ratings, such transistors are generally characterized by high cost and low availability. The problem then becomes an economic one of attempting to utilize a plurality of low cost, readily available transistors to achieve a high voltage switching operation. The alternative approach of employing a plurality of low cost transistors to accomplish the switching application is inherently plagued with reliability problems in that great care must be taken to insure that the maximum ratings for the individual transistor elements are not exceeded. As is known, if the maximum dissipation and/or the reach-through or "punch through" voltage of any transistor is exceeded, the element is likely to be permanently damaged or destroyed.

In a transistorized switching apparatus including a plurality of serially disposed transistors while means for providing equal static protective means have been known in the art, an effective means for protecting each transistor of a plurality of serially disposed group during transient or switching times has not to applicant's knowledge been developed in the art.

It is therefore an object of the present invention to provide an improved multi-element transistorized high voltage switching apparatus.

It is another object of the present invention to prevent damage to multi-element transistorized high voltage switching apparatus due to transient phenomenon.

It is a further object of the present invention to provide an improved, low cost, multi-element transistorized high voltage switching apparatus.

It is yet another object of the present invention to provide improved protective circuitry for serially disposed multi-element transistorized high voltage switching apparatus.

In accomplishing the above objects and other desirable aspects, applicant has invented an improved dynamic protection apparatus which affords an opportunity to optimize the switching time with the load for insuring that voltage levels in excess of predetermined voltage levels are not impressed across various ones of a plurality of serially disposed transistors comprising high voltage switching apparatus.

In accordance with the invention, a control transistor and a plurality of controlled transistors each having similar break-through voltage rating less than the voltage magnitude to be controlled, are serially coupled across a source potential to be selectively applied across a load in response to the application of a control signal. First protective means, including a voltage divider, is arranged to insure that substantially equal safe operating potentials appear across the transistors during steady state conditions. Second protective means including the voltage divider and capacitive timing means coupled in the base circuits of the controlled transistors insure safe operating potentials across the entire string by regulating transient potential appearing across the output and therefore across the remote transistors of the series string.

For a more complete understanding of Applicant's invention, reference may be had to the following detailed description in conjunction with the drawings in which.

Figure 1:
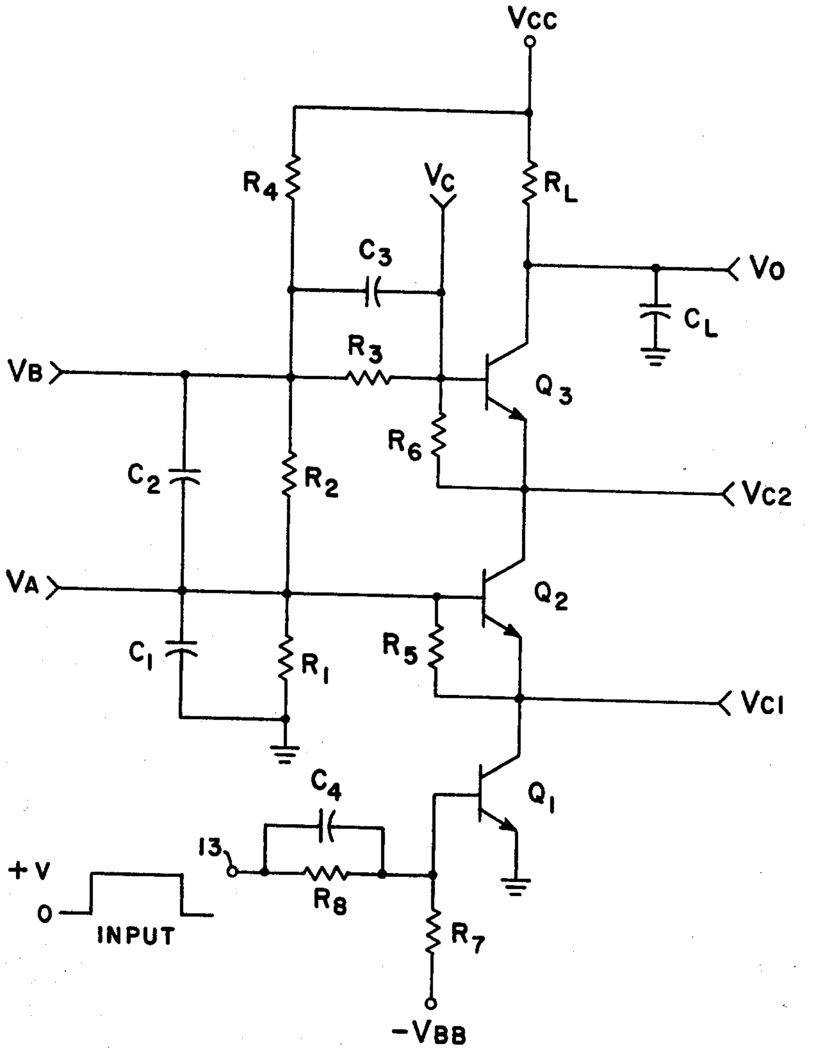
FIG. 1 is a schematic drawing of an improved transistorized switching apparatus in accordance with the principles of the present invention.

Referring now to FIG. 1 there is shown a transistorized high voltage switching apparatus in accordance with the principles of the present invention. As shown transistors $Q_1$, $Q_2$, and $Q_3$ are coupled in a series configuration across a source of potential to be selectively coupled to a load, for example, a capacitive load $C_L$. In the embodiment illustrated, NPN transistors are employed however, as would be evident to those skilled in the art, PNP transistors may be employed by reversing the potentials employed to bias the various electrodes. As shown, the positive terminal of a voltage source $V_{cc}$ is coupled via a load resistor $R_L$ to the collector electrode of transistor $Q_3$. The emitter of $Q_3$ is coupled directly to the collector of $Q_2$ and likewise the emitter $Q_2$ is coupled to the collector $Q_1$.

Suitable biasing potentials for the base electrodes of the slave or controlled transistors $Q_2$ and $Q_3$ are tapped from intermediate points of a voltage divider including $R_1$, $R_2$, and $R_4$ which is coupled between the positive terminal $V_{cc}$ and ground. Employing precision resistors for the voltage divider and making $R_1$, $R_2$ and $R_4$ equal in value equal voltage is insured across each transistor during the steady state condition. Resistors $R_2$ and $R_3$ have one terminal coupled to the respective base electrode of $Q_2$ and $Q_3$ and thus provide base current drive paths for $Q_2$ and $Q_3$. Resistors $R_5$ and $R_6$ are coupled between the base electrode and emitter electrode of transistors $Q_2$ and $Q_3$, respectively, and as hereinafter will be more fully described, decrease the base to emitter resistance of the respective transistors and thereby provide a lower resistance for each path for $I_{CBO}$.

The slave or controlled transistors have a forward biasing potential coupled to their base electrode via resistors $R_2$ and $R_3$ from junctions on the voltage divider. A reversing biasing potential is coupled to the master or control transistor $Q_1$ from an appropriate source of bias $V_{bb}$ via resistor $R_7$. An appropriate input signal is coupled from input terminal 13 to the base electrode of transistor $Q_1$ via resistor $R_8$ having a shunting speedup or peaking capacitor $C_4$ in parallel therewith.

In the absence of a switching pulse at terminal 13 the base-emitter junction of transistor $Q_1$ is reverse biased and transistor $Q_1$ is thus in the off or high impedance state. As shown transistor $Q_1$ employs base drive while transistors $Q_2$ and $Q_3$ employ emitter drive. Thus with transistor $Q_1$ normally biased off no collector current flows in $Q_1$ and thus no emitter current in $Q_2$. Similarly with transistor $Q_2$ off no collector current flows in $Q_2$ and thus no emitter current in transistor $Q_3$. With the transistors off the source potential $V_{cc}$ is seen across the capacitive load $C_L$.

In response to an appropriate input signal as shown coupled to terminal 13 transistor $Q_1$ is rendered conductive. With transistor $Q_1$ in the conductive state collector current begins to flow and thus $Q_2$ is permitted to turn on thereby similarly enabling emitter current to flow in transistor $Q_3$ thereby rendering $Q_3$ conductive. It will be seen that if the control transistor $Q_1$ is rendered conductive the controlled transistors $Q_2$ and $Q_3$ will also be rendered conductive wherey the source potential will be dropped across $R_L$ therey impressing ground across the load capacitance $C_L$. The turn-on operation can take place in a very short length of time. For example, with two controlled transistors turn-on takes place in a typical embodiment of the present invention in approximately one-half microsecond.

As hereinabove stated the series operation of a plurality of transistors in a high voltage application gives rise to many problems since transistors do not normally exhibit the same impedance and thus excessive voltages may appear across those transistors having the higher impedance. To insure safe operating voltages across each of the serially disposed transistors, circuit "slow-down" capacitors $C_1$, $C_2$, and $C_3$ are coupled in parallel with resistors $R_1$, $R_2$, and $R_3$ in order to limit the initial voltages appearing across the various transistors to a safe level until such time as the transistors have turned off. Equal voltages can then be forced to appear across each transistor by means of the voltage divider action in which the divider resistors are considerably lower in value than the off resistance of the transistors. With safe operating voltages insured in the steady state condition y the operation of the voltage divider network, the relationship between the load time constant $R_L$, $C_L$ and the circuit time constant RC must be designed to insure transient voltage levels impressed across the output transistor $Q_3$ are limited to a safe value.

In order to insure safe voltages across the transistors $Q_1$, $Q_2$, and $Q_3$ at the instant of turnoff, the capacitors $C_1$, $C_2$, and $C_3$ are employed in conjunction with the load capacitance $C_L$ to "slowdown" the initial voltages that appear across the transistors. The transistors should all turn off during the initial "slow-down" time interval. As hereinafter will be more fully descried it is preferable where output pulses having fast rise times are desirable and where wide variations in turn-off time of the individual transistors do exist, that the slowest transistor be employed in the master or control transistor position. Similarly where slower rise times can be tolerated, the position of the transistor having the slowest turn-off time is less critical.

Safe voltage levels across each transistor do not necessarily imply equal voltages since the voltage across $Q_3$ is a function of the ratio between the load and protective circuit time constants $R_LC_L$ and RC, respectively, in addition to the voltage $V_{cc}$. Thus, the correct ratio between $R_LC_L$ and the protective circuit time constant RC must be chosen to insure that the collector to emitter and the collector to base voltage of the output transistor $Q_3$ will not exceed rated values during the transient state. For a typical transistor which may be employed, as will hereinafter be more fully explained, in applicant's circuit the collector to emitter and collector to base ratings are 400 and 450 volts, respectively. Thus, by satisfying the lower, i.e., the collector to emitter, maximum rating insures safe operating potentials across all electrodes of the output transistor $Q_3$. With respect to FIG. 1 and the potentials at the indicated points, the safe operating transient voltages, i.e., less than 400 volts, for $Q_3$ may be expressed:

(Equation 1) $V_0(t)-V_c(t)\leqq 400$

Expressions for the output voltage $V_0$ and the potential at the base and thus the emitter of $Q_3$ may be written as a function of time and substituted into Equation 1 as follows:

(Equation 2)

$$V_{cc}-V_{cc}e^{\frac{-t}{R_LC_L}}-\frac{2V_{cc}}{3}+\frac{V_{cc}}{3}e^{\frac{-t}{RC}}+\frac{V_{cc}}{3}e^{\frac{-3t}{RC}}\leqq 400$$

For $V_{cc}$ equal to 1000 volts, Equation 2 may be reduced and rewritten as:

(Equation 3)

$$-3e^{\frac{-t}{R_LC_L}}+e^{\frac{-t}{RC}}+e^{\frac{-3t}{RC}}\leqq 0.2$$

Now defining the ratio of the protective circuit time constant RC to the load time constant $R_LC_L$ as:

(Equation 4)

$$K=\frac{RC}{R_LC_L}$$

By substituting Equation 4 into Equation 3, Equation 3 may be rewritten as:

(Equation 5)

$$-3e^{\frac{-Kt}{RC}}+e^{\frac{-t}{RC}}+e^{\frac{-3t}{RC}}\leqq 0.2$$

Figure 2:
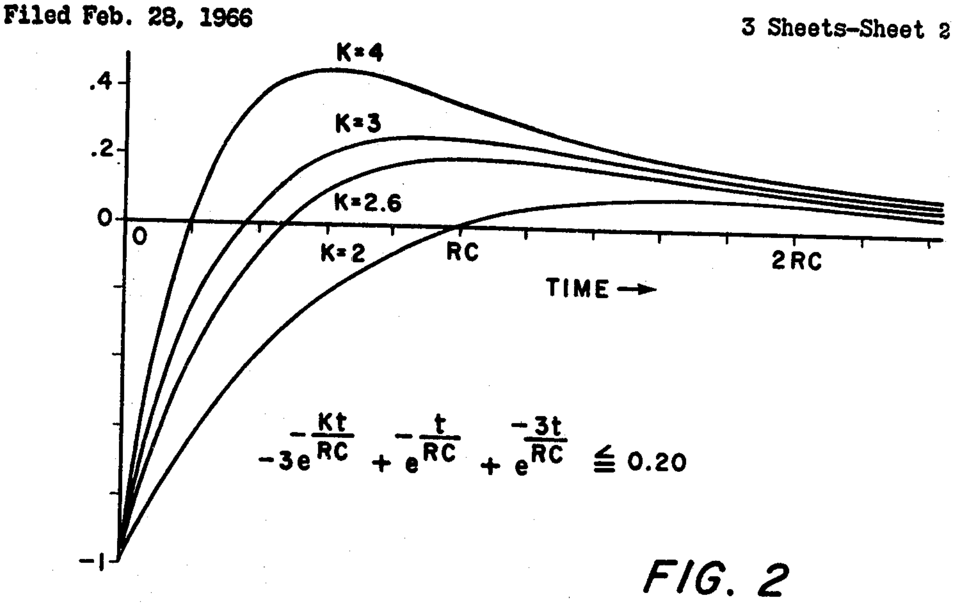
FIG. 2 is a graph of various values of a design parameter useful in understanding the design of the circuit illustrated in FIG. 1.
Figure 3:
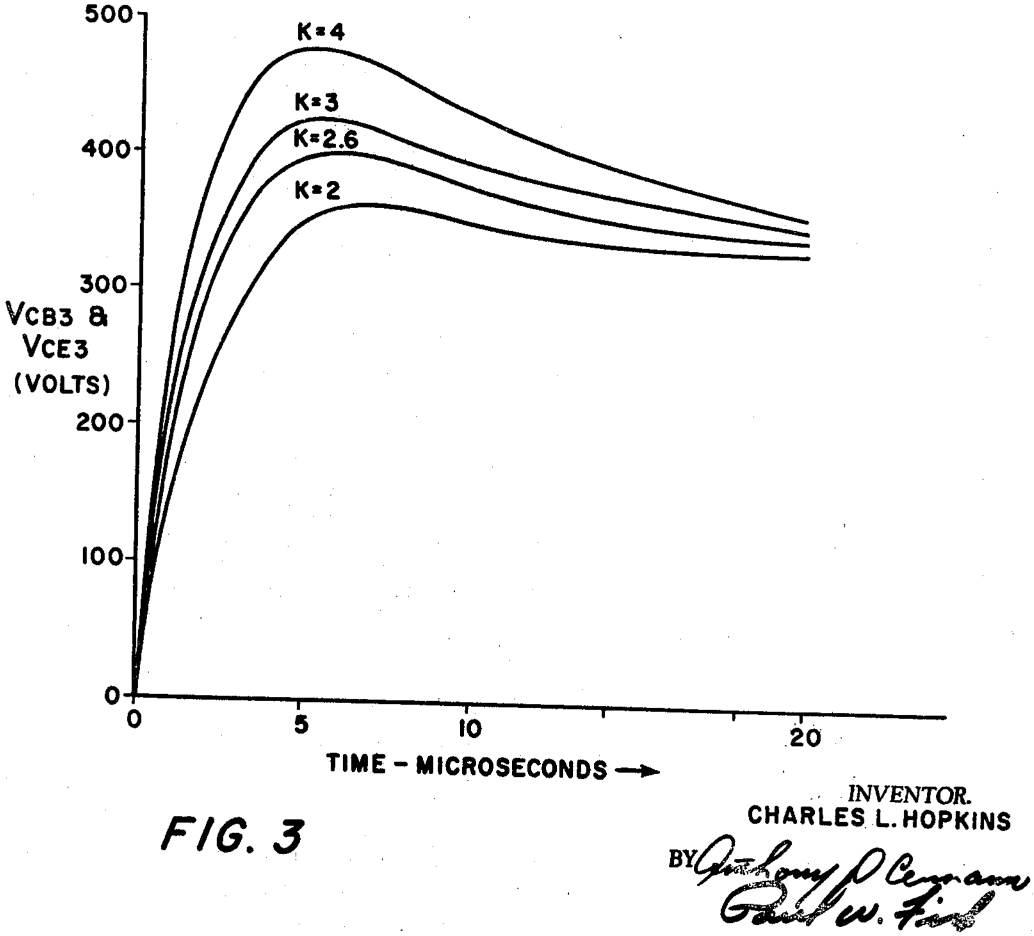
FIG. 3 is a series of voltage-time curves characterizing the operation of the circuit illustrated in FIG. 1 for variout ratios of the protective circuit time constant to the load time constant.

Acceptable ratios of protective circuit time constant RC to load time constant $R_LC_L$ may be derived by solving Equation 5 for various values of K. As seen in FIG. 2 Equation 5 may be plotted for various values of K and thus it may be determined which values of K are compatible with the supply voltage and ratings of the transistor. As shown in FIG. 2, for the voltage and transistor chosen, the value of K must be less than or equal to approximately 2.6 in order to insure that the collector-emitter voltage rating of 400 volts of transistor $Q_3$ is not exceeded by the transient voltage impressed thereacross. By substituting different values of K into the expressions for $Vc(t)$ and then subtracting this value from the expression for the output voltages as a function of time $V_0(t)$, the voltage across the output transistor $Q_3$ as a function of time may be determined for various values of K. As shown in FIG. 3, reducing the value of K, i.e., the ratio of the protective circuit time constant RC to the load time constant $R_LC_L$ reduces the transient voltage across the output transistor $Q_3$. Assuming that the load time constant $R_LC_L$ is fixed due to the rise time requirements and that the value of the resistors of the voltage divider are selected on the basis of the desired level of base drive, then a slow-down capacitor C compatible with these requirements must be chosen. Since low values of C would tend to cancel the desired effect of slowing down the initial voltages appearing across $Q_1$ and $Q_2$ and excessive voltages may thus appear across the transistors, the problem becomes one of selecting the maximum value of C that would hold the transient voltage seen by $Q_3$ within the safe voltage limits.

The table below lists values of circuit components compatible with one embodiment of applicant's switching apparatus which is capable of controlling a one klivolt source at a switching frequency up to 25 kilocycles per second.

TABLE

| | | |
|---|---|---|
| Resistors: | | |
| $R_1$ | ohms | 175K |
| $R_2$ | do | 175K |
| $R_3$ | do | 175K |
| $R_4$ | do | 175K |
| $R_5$ | do | 680 |
| $R_6$ | do | 680 |
| Capacitors: | | |
| $C_L$ | picofarads | 40 |
| $C_1$ | do | 27 |
| $C_2$ | do | 27 |
| $C_3$ | do | 27 |
| Transistors: | | |
| $Q_1$ | | 2N3439 |
| $Q_2$ | | 2N3439 |
| $Q_3$ | | 2N3439 |

As hereinabove stated the selection for the value of the circuit slow-down capacitor is substantially a trade off or compromise between desirable values for $R_L$ and R and the safe operating transient voltage values. From Equation 5 with the highest acceptable value of K taken from FIG. 2, the value of the capacitance C compatible with the circuit parameters may be determined from the equation:

(Equation 6) $C=KR_LC_L/R$

For the values listed in the table, C may be calculated to be 29.8 picofarads. The 27 picofarad value from the table is a compromise utilizing the next lowest standard value of capacitor readily obtainable commercially. The load resistor $R_L$ was chosen such that the transistors will operate near the peak of the typical $h_{FE}$ vs. $I_c$ curve. This affords an opportunity to decrease the power dissipated in the voltage divider by increasing the value of the resistor $R_1$ through $R_4$ since rsistors $R_2$ and $R_3$ are both direct current base drive paths for transistors $Q_2$ and $Q_3$. In addition resistor $R_2$ forms an integral part of the steady state divider network which draws bleeder current from the supply. The divider resistors $R_1$, $R_2$ and $R_4$ being of substantially equal value insures, as hereinabove stated, equal voltages across distribution transistors $Q_1$, $Q_2$ and $Q_3$ during the steady state condition. The value for resistors $R_5$ and $R_6$ was chosen for compatible operation with the 2N3439 transistors to decrease the base-emitter resistance of transistors $Q_2$ and $Q_3$ and thereby provide a lower resistance leakage path for $I_{CBO}$. In a high voltage switching application the divider and base drive resistors will be quite large and the voltage rating of $Q_2$ and $Q_3$ would approach the $V_{CEO}$ rating which is less than $V_{CER}$ rating where as R is a base to emitter resistance of the transistors. For the 2N3439 transistor the $V_{CER}$ rating is 400 volts with $R_{BE}$ less than or equal to one kilohm.

Returning now to FIG. 1 a description of the switching circuit during turn-off will be given assuming that all transistors turn off in approximately the same time.

As hereinabove stated where wide variations in turn-off times for the individual transistors to be employed are encountered it is preferable that the transistor having the slowest turnoff time be employed in the master or switching control position, i.e., transistor $Q_1$. With the transistors in the on condition the voltages $V_A$ and $V_C$, i.e., the base of transistors $Q_2$ and $Q_3$, respectively, are approximately at the potential of the emitter of $Q_1$, i.e., ground. The potential $V_B$, i.e., the junction of resistors $R_2$, $R_3$ and $R_4$ of the voltage divider, is as hereinabove stated, through the action of the voltage divider at $Vcc/3$ and thus current is supplied to the three transistors thereby causing the output voltage, $V_0$, to be held at the emitter potential of transistor $Q_1$, i.e., approximately ground.

At the instant of turnoff, i.e., upon the trailing edge of the pulse applied to the input terminal 13 the base of transistor $Q_1$ is returned to its normal reverse bias coupled through resistor $R_7$. Thus $Q_1$ begins to turn off and, in the manner hereinabove described, $Q_2$ and $Q_3$ being emitter controlled must turn off due to the decreasing collector current in $Q_1$ which controls the emitter current in transistors $Q_2$ and $Q_3$, respectively. Thus under the influence of the voltage divider at the instance of turn off of transistor $Q_1$ the voltage at $V_B$ begins to rise towards $2Vcc/3$ similarly the voltage $V_A$ starts towards $Vcc/3$ and the voltage $Vc$ starts towards $2Vcc/3$. The respective transient voltages $V_A(t)$, $V_B(t)$ and $V_C(t)$ may be expressed as:

(Equation 7)

$$V_A(t)=\frac{V_{cc}}{3}\left(1-\frac{e^{\frac{-t}{RC}}}{2}-\frac{e^{\frac{-3t}{RC}}}{2}\right)$$

(Equation 8)

$$V_B(t)=V_{cc}-\frac{V_{cc}}{3}\left(1+e^{\frac{-3t}{RC}}\right)$$

(Equation 9)

$$V_C(t)=\frac{2V_{cc}}{3}\left(1-\frac{e^{\frac{-t}{RC}}}{2}-\frac{e^{\frac{-3t}{RC}}}{2}\right)$$

As is known the voltage $V_{C1}$ at the emitter of $Q_2$ will follow the voltage $V_A$ at the base of $Q_2$ and likewise the voltage $V_{C2}$ at the emitter of $Q_3$ will follow the voltage $V_C$ at the base of $Q_3$. Since from Equations 7 and 9 $V_C(t)=2V_A(t)$ and the voltage of the collector of $Q_2$, i.e., $V_{C2}$, will follow $V_C(t)$ therefore the voltage at the collector of $Q_2$ will be twice that voltage seen at the collector of transistor $Q_1$, i.e., $V_{C1}$.

The expression for the output voltage $V_0$ as a function of time during turnoff may be expressed as:

(Equation 10)

$$V_0(t)=V_{cc}\left(1-e^{\frac{-t}{R_LC_L}}\right)$$

Figure 4:
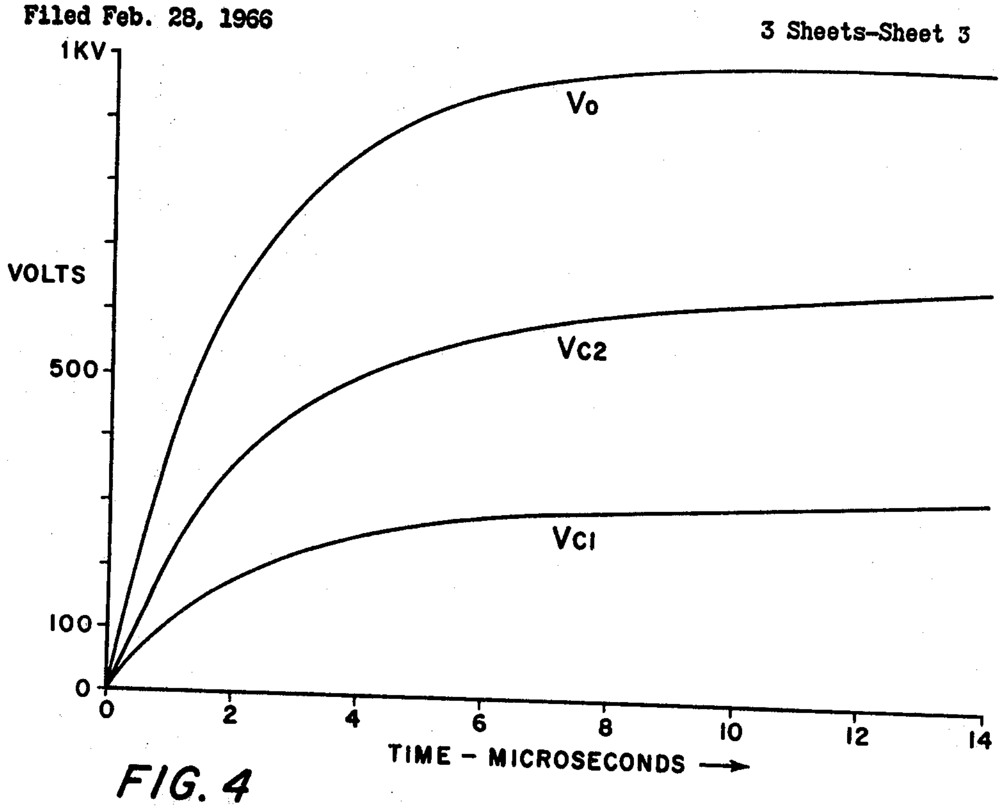
FIG. 4 shows a series of voltage-time waveforms illustrating the transient potential at points in the circuit illustrated in FIG. 1.
Figure 5:
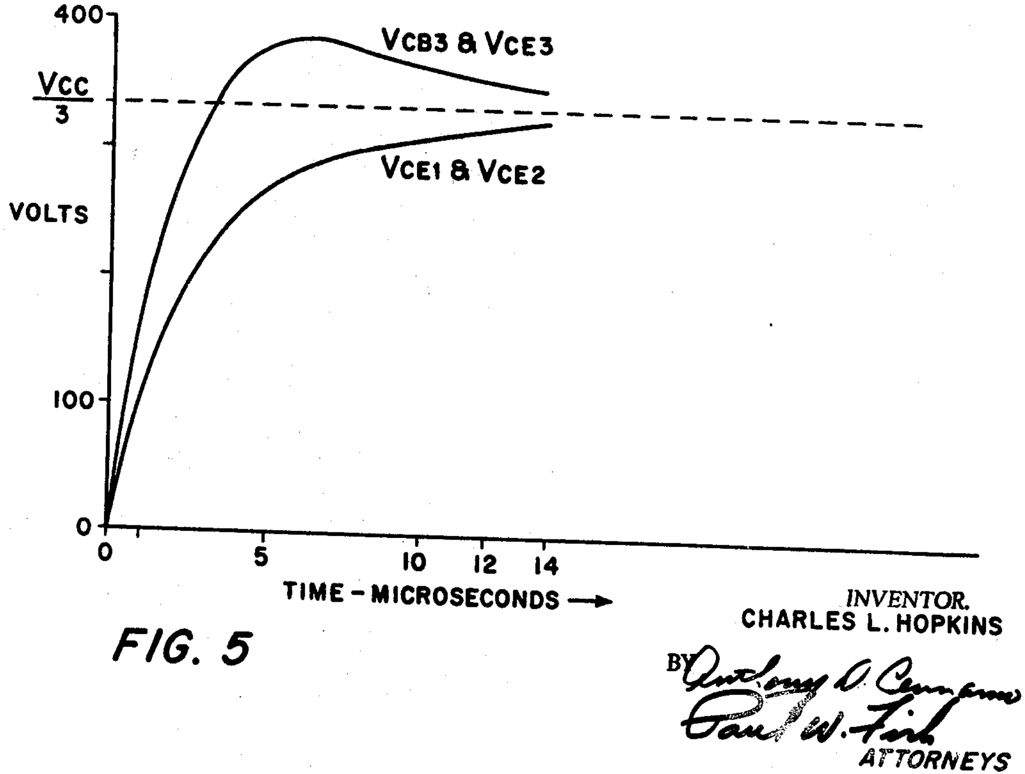
FIG. 5 is a series of voltage-time waveforms illustrating the safe but not necessarily equal voltages appearing across the transistors of FIG. 1 during turnoff.

The curve for $V_0$ and $V_{C1}$ and $V_{C2}$ during turn off are shown in FIG. 4. As shown by inspection of these curves the voltage appearing across the respective transistors, i.e., the voltage beween the various curves are not in excess of the rated values for the 2N3439 transistors. Similarly FIG. 5 shows that transient voltages across the three transistors of the high voltage switching apparatus shown in FIG. 1 while differing considerably are within the rating for the value for the 2N3439 with a source supply voltage of 1000 volts and a ratio of the protective circuit time constant RC to the load time constant $R_LC_L$ equal to the value of 2.36.

In the foregoing there is disclosed an improved transistorized switching apparatus for switching a voltage of magnitude greater than the rated voltage of any one transistor of a series chain. In accordance with applicant's teaching safe operating voltages are forced to appear across the individual transistors of a series string not only during steady state but more importantly also during transient or switching times.

While applicant's invention has been disclosed and described in conjunction with a particular embodiment thereof, many modifications will suggest themselves to those skilled in the art for practicing applicant's invention without departing from the spirit and scope of the invention. For example, while the switching apparatus is disclosed in conjunction with driving a capacitive load the circuit may be equally employed with other types of load devices. Thus it is to be understood that many modifications by those skilled in the art may be made without departing from the disclosed invention and thus it is applicant's intention to be limited only by the scope of the appended claims.

What is claimed is:

1. A multi-transistor switching apparatus comprising:
a control transistor having a base, an emitter and a collector, said base of said control transistor being responsive to switch activating signals;
a plurality of controlled transistors each having a base, an emitter and a collector including an output transistor, each of said controlled transistors being responsive to the conduction status of said control transistor;
means for coupling said emitter and said collector of each of said controlled transistors and said emitter and said collector of said control transistor in series relationship with load impedance means across a main source of potential and a reference source potential;
voltage divider means comprising resistors of equal value coupled across said sources of potential for developing predetermined intermediate voltage levels;
first protective means for coupling forward biasing potentials from said voltage divider to said controlled transistors and for distributing substantially equal steady state operating voltage levels across the respective transistors;
second protective means for insuring safe transient voltage levels across said transistors during both the turn on and turn off times of said switching apparatus;
said first protective means including resistive coupling means for coupling predetermined intermediate voltage levels from said voltage divider means to the base electrodes of said controlled transistors;
said second protective means including slow down capacitors coupled with said resistive coupling means, said second protective means serving as a time constant circuit whereby the ratio of the time constant of said second protective means and the time constant of said load impedance means is maintained at a predetermined value and said time constant of said second protective means RC is related to the load time constant $R_LC_L$ by the expression $K=RC/R_LC_L$, wherein K is a constant less than or equal to a predetermined number required to maintain the transient voltage level seen by the output transistor within the maximum collector to base and collector to emitter voltage ratings of the output transistor.

2. The improved switching apparatus defined in claim 1 wherein one of said slow down capacitors is in shunt with said resistive coupling means of said voltage divider proximate said source of reference potential.

3. The improved switching apparatus defined in claim 1 wherein at least one resistive coupling means includes a resistor common to said voltage divider means.

4. The improved switching apparatus defined in claim 1 additionally including resistive means coupled between said base and emitter electrodes of said controlled transistors for lowering the base emitter resistance thereof.

5. The improved switching apparatus defined in claim 1 additionally including an input terminal, means for coupling a source of reverse bias to said base of said control transistor, and means for coupling control pulses applied to said input terminal to said base of said control transistor for rendering the transistor conductive.

References Cited

UNITED STATES PATENTS

| | | | |
|---|---|---|---|
| 2,997,606 | 8/1961 | Hamburger et al. | 307—246 |
| 3,244,910 | 4/1966 | Leifer | 307—254 |
| 3,007,061 | 10/1961 | Gindi | 307—254 |
| 3,056,043 | 9/1962 | Baude | 307—297 |
| 3,268,776 | 8/1966 | Reed | 307—254 XR |

FOREIGN PATENTS 1,020,673 12/1957 Germany.

OTHER REFERENCES

"High Voltage Switching Circuit" by Xylander in IBM Technical Disclosure Bulletin, vol. 5, No. 12, dated May 1963, pp. 55–56.

"Stacked Transistors Switch Higher Voltages" by Gray in Electronic Design, dated May 25, 1964, pp. 69 and 70.

JOHN S. HEYMAN, Primary Examiner

STANLEY D. MILLER, Assistant Examiner

U.S. Cl. X.R.

307—202, 293, 297